United States Patent [19]

Förster et al.

[11] 4,318,689

[45] Mar. 9, 1982

[54] BURNER FOR LIQUID FUELS

[75] Inventors: Siegfried Förster, Alsdorf; Berthold Sack, Aachen, both of Fed. Rep. of Germany

[73] Assignee: Kernforschungsanlage Jülich GmbH, Jülich, Fed. Rep. of Germany

[21] Appl. No.: 135,083

[22] Filed: Mar. 28, 1980

[30] Foreign Application Priority Data

Mar. 29, 1979 [DE] Fed. Rep. of Germany ....... 2912519

[51] Int. Cl.³ .......................... F23D 11/44; F24H 3/00
[52] U.S. Cl. .................................... 431/208; 219/374; 219/375; 219/378; 219/382; 431/215
[58] Field of Search ...................... 431/207, 208, 215, ; 432/223; 219/374, 375, 378, 381, 382

[56] References Cited

U.S. PATENT DOCUMENTS

| 3,869,242 | 3/1975 | Schladitz | 431/208 |
| 3,914,096 | 10/1975 | Schladitz | 431/208 |
| 4,008,041 | 2/1977 | Roffe et al. | 431/208 |
| 4,193,755 | 3/1980 | Guarnaschelli et al. | 431/208 |

Primary Examiner—John J. Camby
Attorney, Agent, or Firm—Karl F. Ross

[57] ABSTRACT

A burner system in which an ignitable mixture is formed from vaporized liquid fuel and preheated air which is heated by recuperative heat exchange with a furnace exhaust gas from the combustion chamber in which the mixture burns. According to the invention, a feed line for the fuel opens into a closed chamber provided with porous walls permeable to the fuel and with a flow passage traversed by the preheated air, the wall of this flow passage in turn serving for indirect heat exchange of the air by the combustion gases of the furnace.

6 Claims, 2 Drawing Figures

BURNER FOR LIQUID FUELS

CROSS REFERENCE TO RELATED APPLICATION

The present application is related to the commonly assigned copending application Ser. No. 100,634 filed Dec. 5, 1979.

FIELD OF THE INVENTION

Our present invention relates to a burner for a liquid-fuel-fired furnace and, more particularly, to a burner for forming and burning an ignitable mixture of a liquid fuel and a combustionsustaining gas such as air.

BACKGROUND OF THE INVENTION

Liquid-fuel-fired burners capable of producing an ignitable mixture of the fuel and combustion air and of sustaining such combustion in the fire box or combustion chamber of a furnace, boiler or the like, are known. Such systems have a feed line for the liquid fuel, a duct through which the combustion air is supplied, and even an arrangement whereby the hot combustion or exhaust gases from the combustion chamber and before discharge to a stack, chimney or the like, serves to preheat the combustion air.

Burners of this type can be used in industrial furnaces as well as in small heat-generating plants and are advantageous because the recovery of heat from the waste gases and the preheating of the combustion air reduces the fuel requirements.

When the fuel is available in a liquid state, e.g. is fuel oil or heating oil, it is important to ensure good mixing of the fuel and the air so that the combustible mixture is more or less homogeneous and uniform and can sustain a uniform combustion throughout the region into which the combustible mixture is discharged.

In earlier systems utilizing liquid fuels, the fuel is sprayed, atomized or otherwise dispersed into the preheated combustion air which can be at a temperature sufficient to rapidly evaporate the fuel, the evaporation rate being greater as the fuel surface area increases with a finer subdivision of the liquids.

Reference can be made to the dissertation by R. Buchheim, RWTH-Aachen, Germany, "*Untersuchungen zum Emissionsverhalten von Pkw-Gasturbinenbrennkammern*", 1977.

Thus the generation of an ignitable mixture in accordance with these principles requires that the air be at a temperature above the boiling point of the liquid fuel.

However, with air preheated to such temperatures cracking processes can occur in the fuel which can result in the deposition of carbon black, soot or other particulates in the combustion chamber and in ducts or passages traversed by the exhaust gas.

Consequently, the application of the principle has been limited or had to be combined with relatively frequent cleaning of the burner system and/or the combustion chamber.

OBJECTS OF THE INVENTION

It is the principal object of the present invention to provide an improved burner of the liquid-fuel-fired type which avoids the drawback of prior art systems as mentioned above but which nevertheless is capable of producing a uniform combustion in a fuel/air mixture.

Another object of this invention is to provide a liquid-fuel burner which can maintain the fuel at a relatively low temperature so that cracking does not ensue, but which nevertheless brings about rapid and efficient mixing of the fuel and the combustion air to form a combustible mixture free from the problems encountered heretofore, i.e. without heating of the fuel to a point that cracking may occur.

It is also an object of the invention to provide a relatively simple, reliable and efficient burner capable of operating with liquid fuels.

SUMMARY OF THE INVENTION

These objects and others which will become apparent hereinafter are attained, in accordance with the present invention, in a burner which comprises a chamber formed with porous fuel-permeable walls and into which the liquid fuel is fed so that this fuel can pass through the pores in a thin film and can be exposed on the exterior surfaces of the chamber to preheated air which is conducted through a passage surrounding the chamber. The air, in turn, traverses a duct forming this passage and spacedly surrounding the chamber while having a thermally conductive wall through which heat exchange is effected between the furnace exhaust or combustion gases and the air. These gases thus pass through a further duct or conduit surrounding the first-mentioned duct.

A feed line opens into the chamber for delivering the liquid fuel thereto.

In the burner of the present invention, the porous walls break up the liquid into a liquid film so that this film has a large surface area to fuel volume ratio at the point at which it contacts the preheated air and thus directly and without delay or cracking-type decomposition is evaporated into the surrounding preheated combustion air.

Since the film spreads thinly on the exterior chamber walls, the latter are cooled by evaporative cooling processes so that overheating of the film or the chamber wall cannot occur. The fuel vapors mix thoroughly with the combustion air and the resulting ignitable mixture is discharged from the mouth of the burner. The heating of the combustion air by the oppositely moving combustion gases over the passage surrounding the chamber is carried out so that the combustion air is at a temperature between the boiling point and the temperature of the liquid fuel film on the surface of the porous chamber walls.

According to another feature of the invention, the chamber is a hollow cylinder closed at least at its front end and radially spaced coaxially from the inner duct having the thermally conductive wall mentioned previously.

At least in the region of this chamber, therefore, the inner duct is also cylindrical.

At the mouth of the burner or between this mouth and the combustion chamber, means may be provided for igniting the mixture.

When the chamber is formed as a closed-end hollow cylinder and the ducts are formed as cylindrical members coaxial and symmetrical therewith, the entire burner assembly is of relatively simple construction and all of the parts thereof are readily accessible.

To permit cold start of the burner, the passages for the combustion air can be formed with an electrical heating element, e.g. helically surrounding the thermally conductive wall or embedded therein. This electrical heating element is energized when no hot combustion gases are available, to preheat the air and form the combustible mixture which is then ignited. When combustion gases of a sufficient temperature develop the electric heating is turned off and recuperative heat exchange is utilized as described.

The porous walls of the chamber can be of ceramic (see the aforementioned copending application) of a metallic material, for example silicon carbide, silicon nitride, aluminum oxide, zirconium oxide or magnesium oxide or a sintered metal powder forming a filter material.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
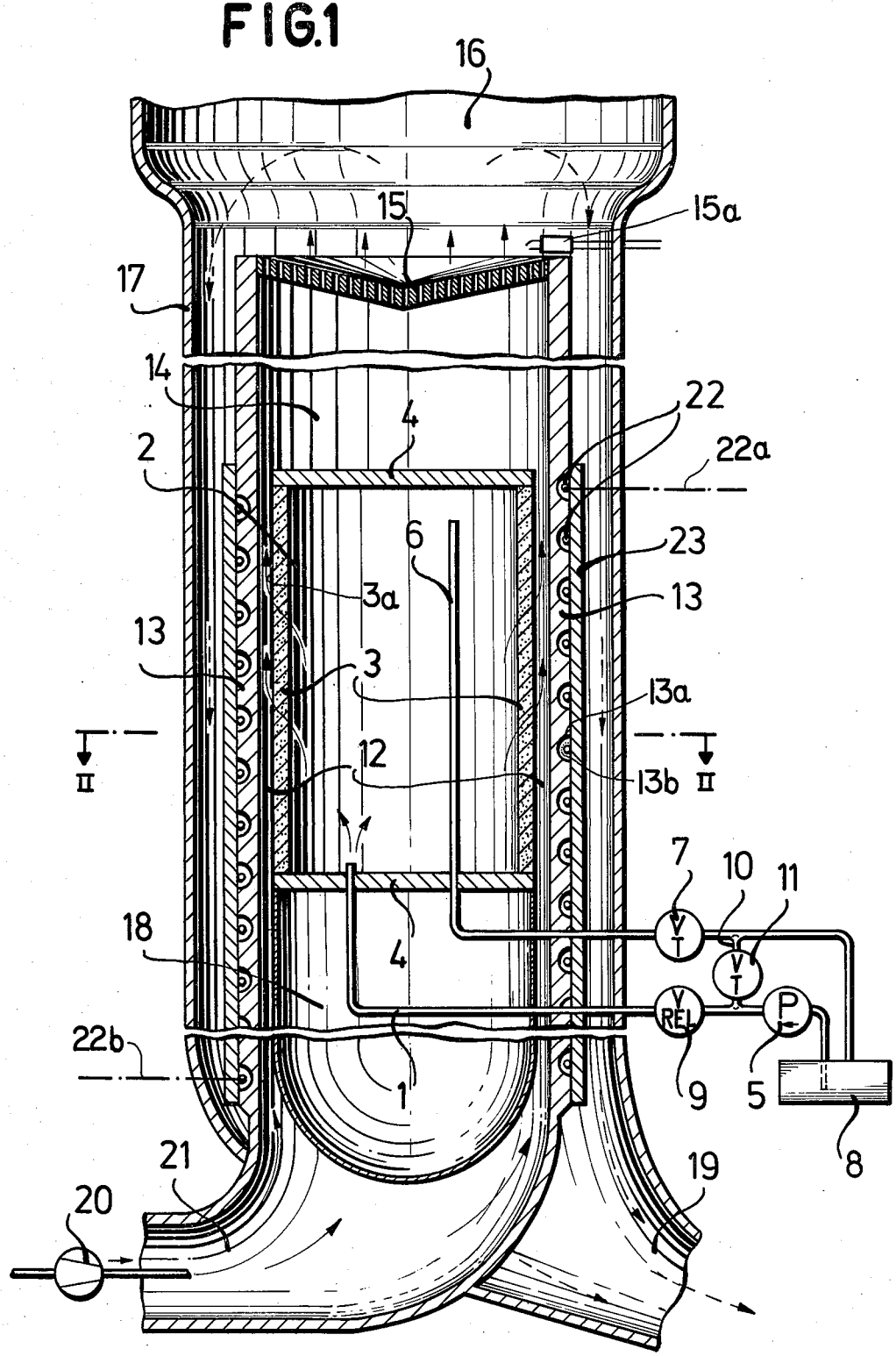
FIG. 1 is an axial cross-sectional view through a burner according to the present invention.
Figure 2:
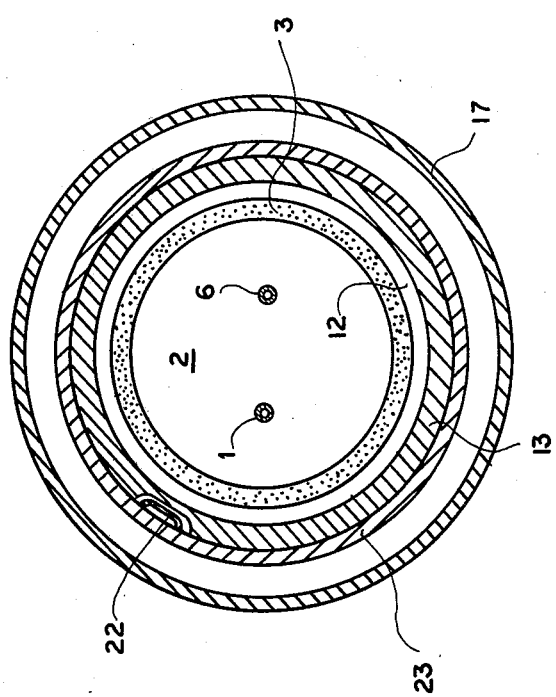
FIG. 2 is a cross-sectional view taken along the line II—II of FIG. 1.

From the drawing it will be apparent that the burner of the present invention comprises a feed line 1 for a liquid fuel which, advantageously, is circulated through a chamber 2 formed with porous lateral wall 3 and closed at its ends by plates 4.

The chamber 2 is cylindrical and the plates 4 are impermeable while the porous wall 3 is penetrated by the liquid fuel which forms a film on the external surface 3a.

The feed line 1 is provided with a pump 5 which displaces the fuel from a tank 8 via a control valve 9 to the chamber 2, the valve 9 serving to maintain a constant pressure in chamber 2 and controlling the volume of the fuel delivered.

A pressure is maintained in chamber 2 in excess of the pressure surrounding the wall 3 and sufficient to enable the fuel to penetrate the porous wall.

An overflow or discharge pipe 6 returns excess liquid fuel via a throttle 7 to the vessel 8. A pipe 10 with a controllable throttle 11 can permit fuel which cannot pass the valve 9 to be returned to the tank 8.

Around the chamber 2 there is formed a flow passage 12 for the preheated combustion air, this passage being defined by a duct 13 which is coaxial with the cylindrical chamber 2. The cross section of the passage 12, which communicates with an air supply line 21 provided with a blower 20, is circulated so that the volume of air traversing the passage can vaporize practically the entire liquid film formed on the surface 3a and entrain this fuel in an ignitable mixture into a homogenization chamber 14 formed in the duct 13 downstream of the chamber 2.

At the discharge end of the homogenization chamber a flame-holding screen 15 is provided at which the mixture is ignited and burned, and igniter being represented at 15a.

The flame develops in the combustion chamber 16.

The flame holder can be formed as a metal screen, as a plate provided with annular slits, or as a perforated plate whose total orifice cross section is selected such that the flow velocity of the mixture is increased and exceeds the propagation velocity of the flame. The flame holder prevents backfiring of the flame into the homogenization chamber.

A portion of the hot exhaust or combustion gases is drawn backwardly through a return duct 17 and a passage formed between this duct and duct 13, thereby heating the air by indirect heat exchange through the wall of the duct 13 in counterflow.

The length of the duct 17 is such that the combustion air is already heated sufficiently before it encounters the film on the wall 3 to evaporate this film.

A guide wall or body 18 is provided upstream of chamber 3 to confine the flow of the combustion air along the inner surface of the duct 13.

After traversing the duct 17, the combustion gases can be discharged through a stack or vent 19.

The duct 13 is provided, along its side turned away from the passage 12 and over its length substantially to the homogenization chamber 14 and the downstream end of chamber 2, with an electric resistance heating coil 22 which can be energized via conductors 22a and 22b to heat the air for cold start of the burner and before combustion gases are available.

Thus the electric heater is turned on and air is permitted to flow through the passage 12 while fuel is pumped through the chamber 2 to establish the fuel/air mixture which is ignitable and burned. Electric heating is maintained until the volume of exhaust gas traversing the duct 17 and its temperature is sufficient by heat exchange to provide the desired degree of air heating. At this point the electric heater is turned off.

The electric heater 22 can be a heating wire received in helical channel 13a of the duct 13 or in axial channels thereof, and is electrically insulated relative to the duct by a layer 13b of electrical insulation.

In the embodiment shown a further tube 23 is shrink-fitted onto the duct 13 and may be composed of electrically nonconducting protective material or matter which is also electrically insulated from the turns of the heating coil.

The duct 13 can also be composed of an electrically conductive ceramic such as silicone carbide and can serve as a resistance heater by being connected at opposite ends to an electric current source. This latter arrangement ensures very uniform heating but requires electrical insulation of the duct 13 from the other parts of the burner.

The film evaporative burner of the present invention has been found to be highly effective for cold start and prolonged operation with practically residue-free combustion of liquid fuels.

The supply of combustion air and fuel can be controlled, e.g. the fuel by the liquid pressure in chamber 2, so that highly efficient fuel/air mixtures can be set rapidly with slight pressure changes in chamber 2.

An important advantage of the invention is that fuel oils or heating oils of various qualities can be used, e.g. both light and heavy heating oils.

The preheating of the combustion air to a temperature of about 200° C. has been found to suffice.

Since there are no droplets of liquid fuel in the mixture, cracking processes are avoided and deposits do not form in the combustion chamber.

The evaporative cooling prevents the fuel in the chamber 2 from being heated to temperatures in excess of 150° C. (the temperature is usually between 120° C. and 150° C.) so no cracking products are found in the chamber.

We claim:

1. A burner for liquid fuels comprising:

a closed chamber formed with at least one liquid-fuel-permeable porous wall;

fuel-feed means connected to said chamber for feeding liquid fuel under pressure thereto whereby the liquid fuel penetrates said wall and forms a liquid film on an external surface thereof;

a first duct surrounding said chamber and defining a combustion-air passage therewith;

means for feeding combustion air through said passage and along said porous wall in contact with said liquid film; and a second duct spacedly surrounding said first duct for conducting a hot combustion gas along said first duct for indirect heat exchange for preheating of said combustion air to a temperature sufficient to enable said combustion air to vaporize said film whereby a mixture of fuel vapor and air is formed downstream of said first duct and said chamber and burns to form the hot combustion gases.

2. The burner defined in claim 1 wherein said chamber is a hollow cylindrical body closed at its opposite ends and said wall is a cylindrical wall, said ducts being cylindrical and coaxial with each other and said chamber at least in the region of said chamber.

3. The burner defined in claim 2, further comprising electric heating means on said first duct for preheating said combustion air in the absence of hot combustion gas.

4. The burner defined in claim 3 wherein said electric heating means is a resistance heating wire disposed on an outer surface of said first duct.

5. The burner defined in claim 4 wherein said wire is wound around said first duct helically in a plurality of turns.

6. The burner defined in claim 1, claim 2, claim 3, claim 4 or claim 5 wherein said fuel-feeding means comprises a fuel feed pipe opening into one end of said chamber,
a reservoir containing liquid fuel,
a pump connected to said reservoir for delivering liquid fuel to said pipe,
a pressure and flow control valve between said pump and said feed line, a return line opening into said chamber at a location remote from said feed line and connected to said reservoir,
a throttle formed along said return line, and
a bypass provided with another throttle connected between a discharge side of said pump and said return line downstream of the first-mentioned throttle.

* * * * *